(12) United States Patent
Stewart et al.

(10) Patent No.: US 9,468,222 B2
(45) Date of Patent: *Oct. 18, 2016

(54) TEA BREWING AND SWEETENING PRODUCT AND PROCESS

(71) Applicants: Paul Alan Stewart, Mobile, AL (US); Adam Paul Stewart, Mobile, AL (US)

(72) Inventors: Paul Alan Stewart, Mobile, AL (US); Adam Paul Stewart, Mobile, AL (US)

(*) Notice: Subject to any disclaimer, the term of this patent is extended or adjusted under 35 U.S.C. 154(b) by 680 days.

This patent is subject to a terminal disclaimer.

(21) Appl. No.: 13/867,526

(22) Filed: Apr. 22, 2013

(65) Prior Publication Data

US 2014/0314912 A1  Oct. 23, 2014

(51) Int. Cl.
| | |
|---|---|
| A47J 31/40 | (2006.01) |
| A23F 3/18 | (2006.01) |
| A23F 3/14 | (2006.01) |
| A47J 31/00 | (2006.01) |
| A47J 31/06 | (2006.01) |

(52) U.S. Cl.
CPC . *A23F 3/14* (2013.01); *A23F 3/18* (2013.01); *A47J 31/002* (2013.01); *A47J 31/0642* (2013.01)

(58) Field of Classification Search
CPC ............ B65D 85/8043; B65D 85/804; B65D 85/8046; B65D 85/808; B65D 2581/3409; B65D 81/3484; A23F 3/40; A23F 3/405; A47J 31/40; A47J 31/407
See application file for complete search history.

(56) References Cited

U.S. PATENT DOCUMENTS

| | | | |
|---|---|---|---|
| 2,362,459 A | 11/1944 | Barnett | |
| 2,791,324 A | 5/1957 | Knoop et al. | |
| 2,791,505 A | 5/1957 | Barnett | |
| 3,186,850 A | 6/1965 | Anthony | |
| 3,809,215 A | 5/1974 | Debry | |
| 4,853,234 A | 8/1989 | Bentley et al. | |
| 5,245,914 A * | 9/1993 | Vitous | A47J 31/007 99/280 |
| 5,895,672 A * | 4/1999 | Cooper | A47J 31/0615 426/433 |
| 2004/0255788 A1* | 12/2004 | Bowe | B65D 81/3261 99/279 |
| 2005/0247207 A1 | 11/2005 | Saint | |
| 2008/0171110 A1 | 7/2008 | Stuart | |
| 2010/0159076 A1 | 6/2010 | Purliyev | |

OTHER PUBLICATIONS

Mesh to micron conversion chart. Oct. 2007.*
https://web.archive.org/web/20091220003545/http://www.nordicsugar.com/industry/granulated-sugar/ Dec. 2009.*

* cited by examiner

*Primary Examiner* — Erik Kashnikow
*Assistant Examiner* — Lela S Williams
(74) *Attorney, Agent, or Firm* — Thomas L. Moses; Southeast IP Group, LLC.

(57) ABSTRACT

A sweet tea brewing product and system for brewing and sweetening tea in a brewing basket of a tea making machine is disclosed comprising at least one water permeable mesh pouch for placement in the brewing basket during brewing. The tea particles and sugar granules are contained in the mesh pouch. The mesh pouch has mesh openings being generally smaller than the size of said sugar granules and said tea particles for retention of said granules and particles. The tea particles and sugar granules are brewed and dissolved in the brewing basket during steeping of the tea particles and sugar granules in hot water to produce a concentrated sweet tea solution delivered from said basket for accurate and consistent brewing of sweat tea.

24 Claims, 5 Drawing Sheets

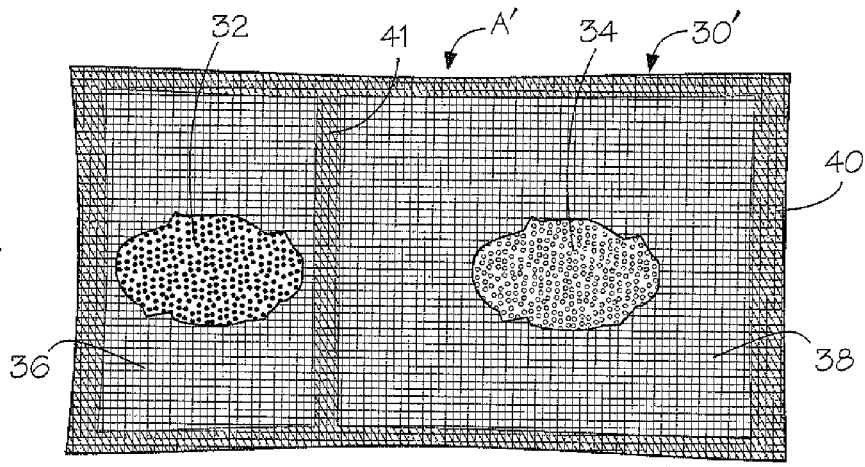
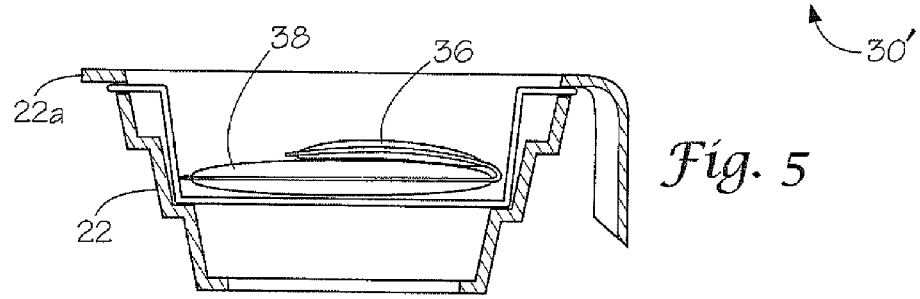
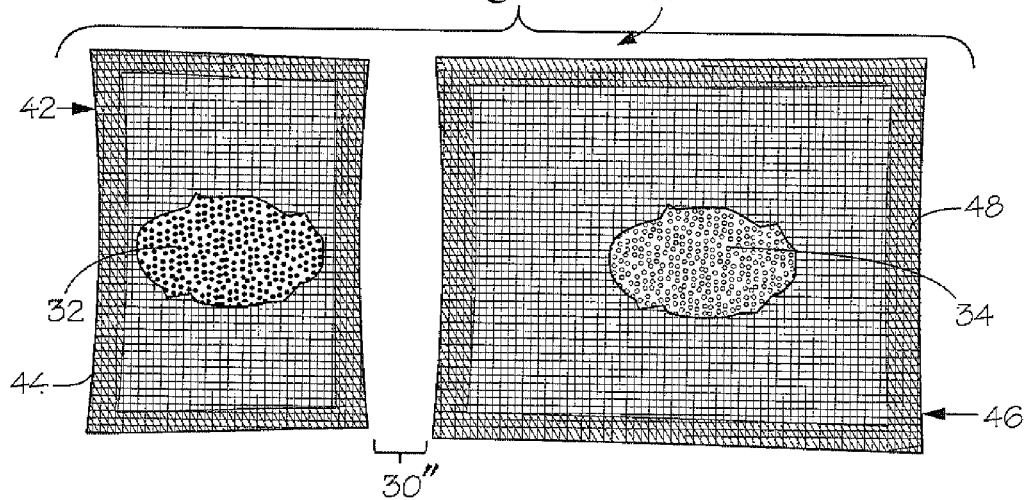

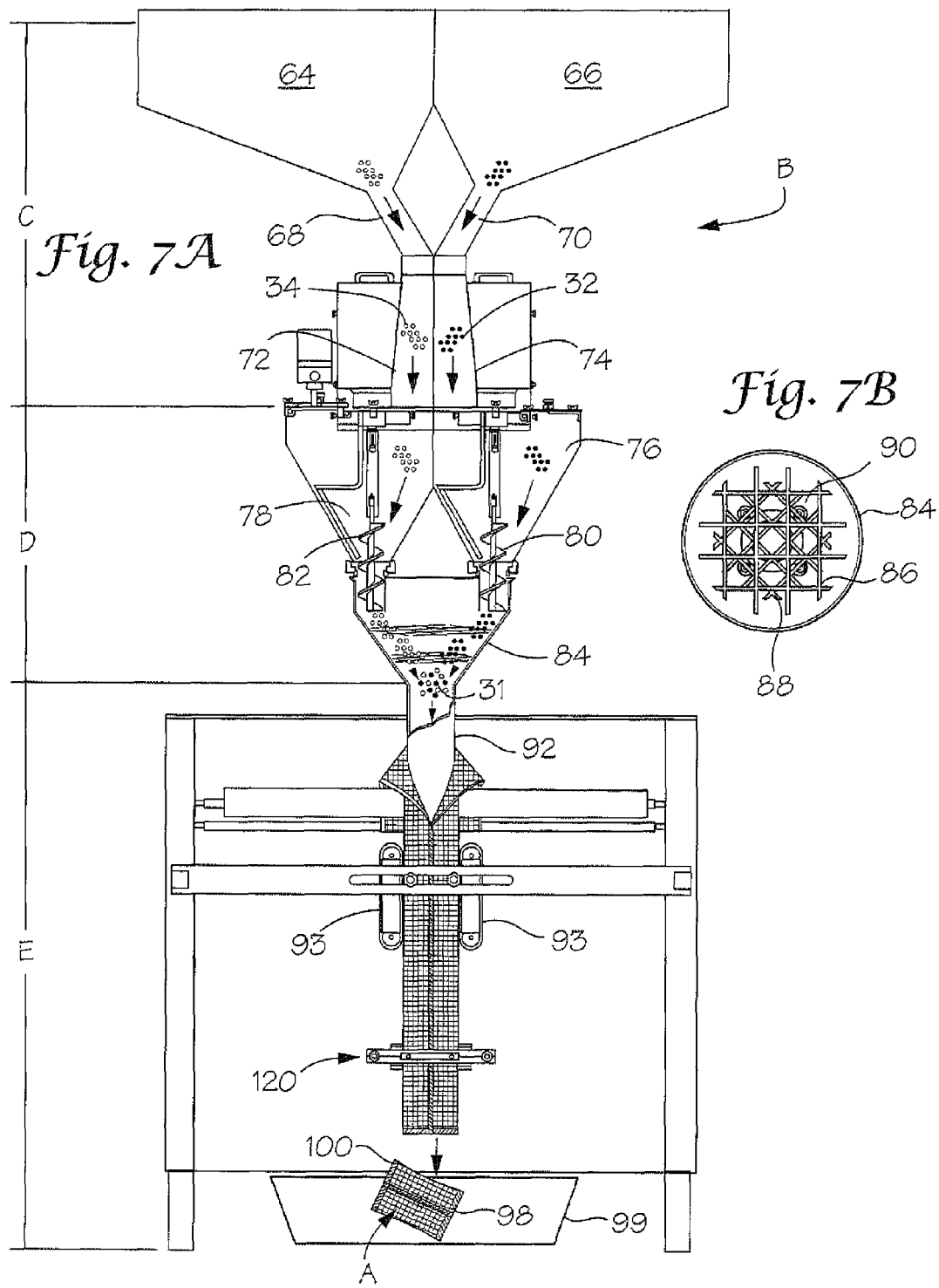

TEA BREWING AND SWEETENING PRODUCT AND PROCESS

The invention relates to the brewing of tea and particularly to a tea and sugar blended product and method which provides accurate and consistent sweetness to the tea when brewed.

BACKGROUND OF THE INVENTION

In commercial tea brewing, such as restaurants, there is a lack of consistency from one batch of tea to the next. The industry uses standard sugar in 50 lb. bags to sweeten tea, and the industry standard is basically one pound of sugar per gallon of tea, which gives a brix of about 11. Brix is a measure (degree) of the sugar consent of an aqueous solution. One degree Brix is one gram of sucrose in 100 grams of solution and represents the strength of the solution as a percentage by weight (% w/w). If the solution contains dissolved solids other than pure sucrose, then the Brix only approximates the dissolved solid content. The Brix is traditionally used in tea, wine, sugar, fruit juice, and honey industries to measure sweetness. Brewed sweetened tea has a typical Brix level of 10½ to 11. The problem is restaurants usually do not have a scale to weigh out one pound of sugar per gallon of tea so the Brix level varies from one urn of tea to the next. Most of the time the people making the sweet tea are the wait staff, and this is a job that is inconvenient to them. The first waitress may like tea really sweet so she adds several cups of sugar when making the tea. A second waitress coming in later in the day, does not like her tea too sweet, so she just puts less cups in the tea. A third waitress likes to talk, so she puts in 4 cups of sugar, gets to talking, and puts 1 more cup of sugar in. So there is no consistency regarding the amount of sugar being put in the urn. In addition, there is an amount of sugar that is not dissolved located in the bottom of the urn that is not considered.

A commercial tea brewing urn typically holds at least 3 gallons of tea and has a brewing basket. A paper filter is placed in the basket and then filled with the tea. Hot water flows into the brewing basket to steep the tea in the basket, and concentrated tea solution is passed into the urn. At the same time, cold water is being delivered into the urn, and the concentrated tea solution and cold water are mixed to make tea. However, when the sugar is added, the temperature of the tea is much cooler. The sugar does not dissolve completely, and some of the sugar reaches the bottom of the urn. If 3 lbs. of sugar is poured into the urn with 3 gallons of tea, some of the sugar goes to the bottom without dissolving. It would take longer, more time than the tea itself lasts, before enough sugar is dissolved to reach a Brix value of 11. There is not much accuracy because sugar that you thought was dissolved, is not.

Various attempts have been made to package tea and sugar together in separate compartments for use as an infusion product which is immersed in hot water. US Published Application No. 2010/0159076 A1 shows a floatable infusion package that may include tea and sugar in separate compartments. US Published Application No. 2008/0171110 A1 shows a foraminous plastic vertical tube that can contain tea and sugar, or other solids, which is rigid enough to grip and stir in a liquid to dissolve or infuse its contents. U.S. Pat. No. 2,362,459 discloses an infusion package and the manufacture thereof that includes compartments A and B wherein one compartment contains tea and the other compartment contains sugar. US Published Application No. 2005/0247207 A1 shows a drink infusion device, including tea, having a submersible element and a buoyant retrievable element. U.S. Pat. No. 3,809,215 shows a floating infusion package for tea. U.S. Pat. No. 2,791,505 shows an infusion package having one compartment filled with tea and another compartment filled with sugar. Other patents show various other means of packaging tea and/or sugar. U.S. Pat. No. 2,791,324 discloses a compartmented package that may include tea in one compartment, sugar in another, and creamer in another compartment, which may be poured into a cup of hot water. U.S. Pat. No. 3,186,850 discloses an infusion package containing beverage ingredients, such as powdered tea sugar carried by a cup, wherein the ingredients are poured into the cup containing hot water. U.S. Pat. No. 4,853,234 discloses a rigid beverage package that can contain any desired beverage ingredients. None of the prior art has provided a way to make sweetened tea accurately and consistently. The floating infusion products are not practical or suitable for brewing tea in an urn.

Accordingly an object of the invention is to provide an accurate and consistent way of brewing sweetened tea.

Another object of the invention is to provide a sweet tea brewing product and method for use in a drip coffee machine which provides an accurate and consistent way of brewing sweetened tea.

Another object of the present invention is to provide sources of tea particles and sugar granules which can be brewed together in prescribed blend ratios in a brewing basket to form a concentrated sweet tea solution that enters the urn hot with sugar dissolved.

Another object of the invention is to provide a mesh pouch containing tea and sugar in a prescribed blended ratio for use in the brewing basket of a drip coffee machine to brew tea accurately and consistently.

Another object of the present invention is to provide a sweetened tea product whereby one may pull a brew basket out of the tea maker and place a mesh plastic pouch containing a prescribed blend ratio of tea and sugar, and push a start button to brew sweet tea consistently, time and time again. This will provide a huge step in the ice tea market.

SUMMARY OF THE INVENTION

The above objectives are accomplished according to the present invention by providing a tea brewing system for brewing sweetened tea comprising a tea brewing machine having a removable brewing basket and a brewing urn. A source of tea particles and sugar granules is provided for placement into the brewing basket during brewing. At least one water mesh pouch contains the source of tea particles and the source of sugar granules having a mesh size for retaining the tea particles and sugar granules. The machine includes a cold water pipe for dispensing water into the tea urn during brewing, and a hot water dispenser for dispensing hot water into the brewing basket to steep the tea particles and sugar granules in hot water in the basket and extract tea and dissolve sugar in the water permeable pouch to produce a concentrated sweetened tea solution delivered into the water in the urn. Preferably, the blend ratio of tea to sugar is in the range of ⅕ to ½₅, and the sources of tea particles and sugar granules are retained in one of a plastic or cotton mesh pouch and blended together in a prescribed blend ratio. The pouch may be a single pouch or include a first compartment for the tea particles and a second compartment for the sugar granules. The first and second compartments may be joined together at a fold line so the tea compartment folds over the sugar compartment in the brewing basket. Preferably, the pouch has a mesh selected from a range of about 50 to 300 microns, and the size of the sugar granules is in the range of U.S. mesh sieve nos. 3-35. A method of brewing sweetened tea comprises providing a tea brewing machine having an urn, a brewing basket carried above the urn, a hot water dispenser for delivering hot water into the brewing basket, and a cold water dispenser for delivering water into the urn while brewing tea. A mesh pouch containing a prescribed blend of tea particles and sugar is placed into the brewing basket. Hot water is dispensed into the brewing basket for steeping the tea particles and sugar granules in the brewing basket to produce a flow of concentrated sweetened tea solution. Water is dispensed into the tea urn simultaneously with the flow of concentrated tea solution whereby the sugar is more completely and consistently dissolved in contrast to the sugar being dissolved in the tea solution in the urn.

DESCRIPTION OF THE DRAWINGS

The invention will be more readily understood from a reading of the following specification and by reference to the accompanying drawings forming a part thereof, wherein an example of the invention is shown and wherein:

FIG. 4 is a top plan view illustrating another embodiment of a tea sweetening product wherein a mesh pouch has two compartments for retaining the tea and sugar;

FIG. 5 is a side cut away illustrating the pouch folded when placed in a brewing basket;

FIG. 6 is a plan view where the pouch includes two separate compartments;

FIG. 7A illustrates a tea and sugar blending apparatus for apportioning and blending tea and sugar, and packaging the blend in a water permeable pouch;

FIG. 7B is a top plan view of a blending/dispensing funnel according to the present invention;

DESCRIPTION OF A PREFERRED EMBODIMENT

Figures 1A, 1B:
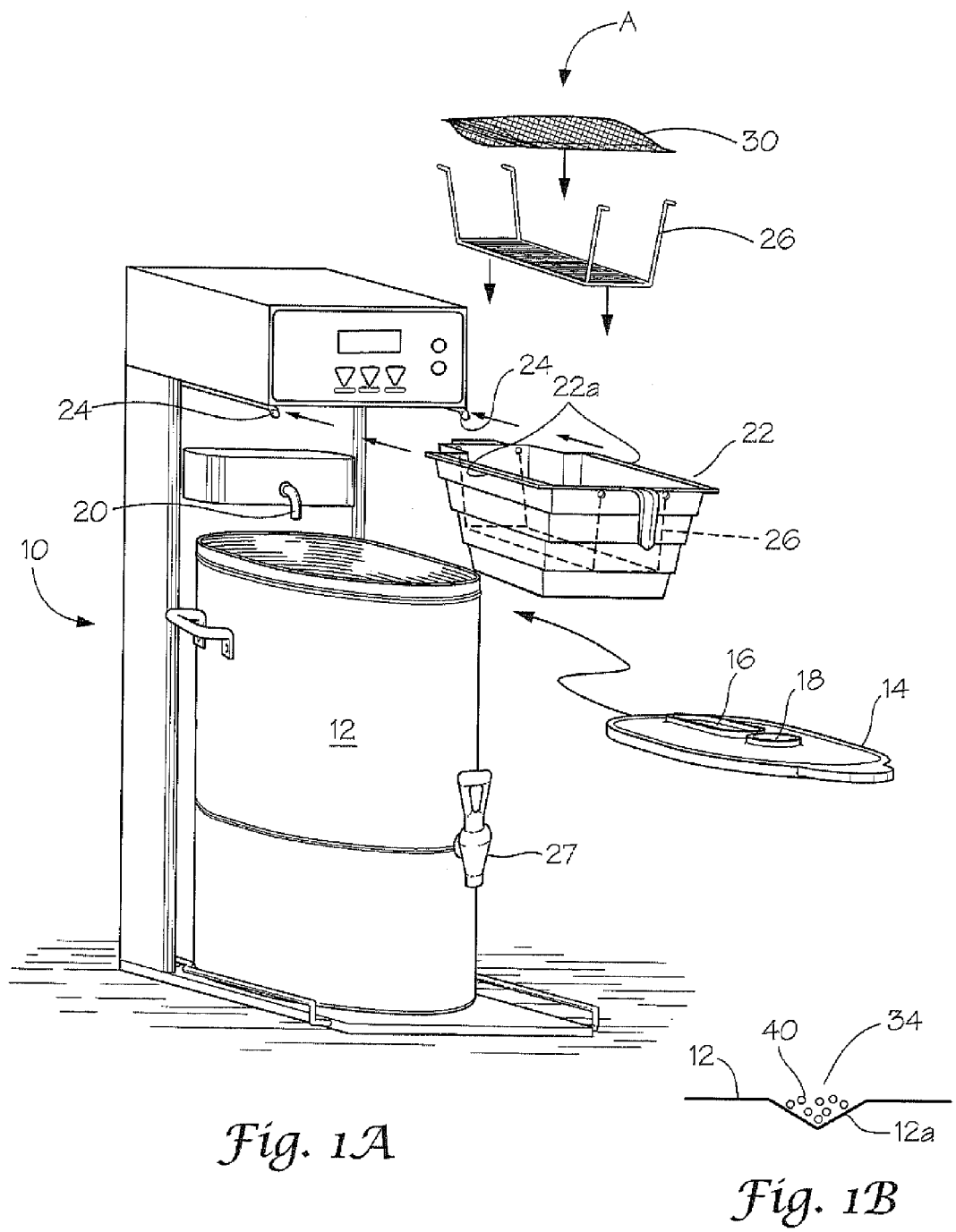
FIG. 1A is a left front perspective view with parts removed illustrating a tea brewing machine having a brew basket for containing tea sweetening and brewing products according to the invention.
FIG. 1B is a front elevation illustrating undisolved sugar in the bottom of an urn.

Referring now to the drawings, the invention will be described in more detail.

As can best be seen in FIG. 1, a tea brewing machine 10 is illustrated having a tea urn 12 with a lid 14. Lid 14 includes a cold water opening 16 and a concentrated sweetened tea solution opening 18. A cold water spout 20 delivers cold or ambient water into the urn during brewing. A filter brewing basket 22 has flanges 22a that are received in slots 24 during use and include a brewing basket having a rack 26 normally used to support a paper filter filled with tea particles. Above the basket is a hot water dispenser which, for example, can include a circular array of water nozzles around the basket 22 and one in the center of the basket (not shown). As can best be seen in FIGS. 2 and 3, a tea brewing and sweetening product A is illustrated which contains a prescribed blend of tea particles and sugar granules blended according to the present invention. Product A includes a pouch 30 in which a blend of tea particles 32 and sugar granules 34 are contained. Pouch 30 is preferably made from a mesh polymer material having a predetermined mesh size to retain the blend while allowing the tea to be extracted and the sugar granules to dissolve in the brewing basket. It is important to note that in the previous methods of brewing tea, sugar is added to the urn after the urn is filled with the tea solution dispensed into the urn at the same time as the cold water is dispensed into the urn. Sugar used to sweeten the tea is thus dissolved in a cool tea solution, reducing its ability to be dissolved. Typically a portion 40 of sugar accumulates in the bottom of the urn so that more sugar is dispensed in the first glasses of tea than in the latter.

Figure 2:
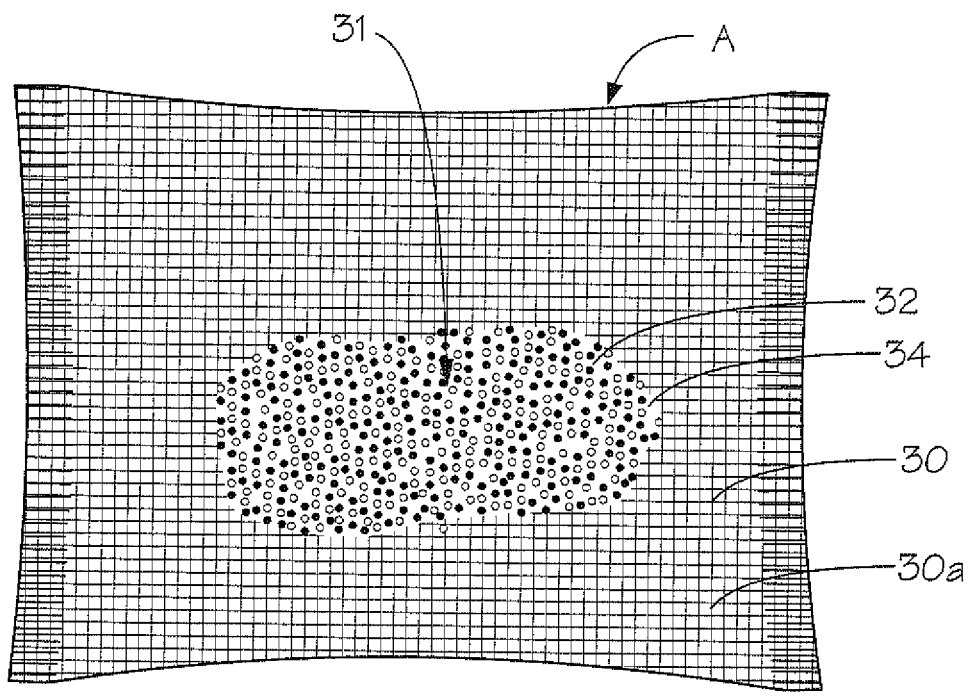
FIG. 2 is a top plan view illustrating a product containing a blend of tea particles and sugar granules retained in specified blend ratios contained in a water permeable mesh pouch for use in a brew basket of a tea brewing machine.
Figure 3:
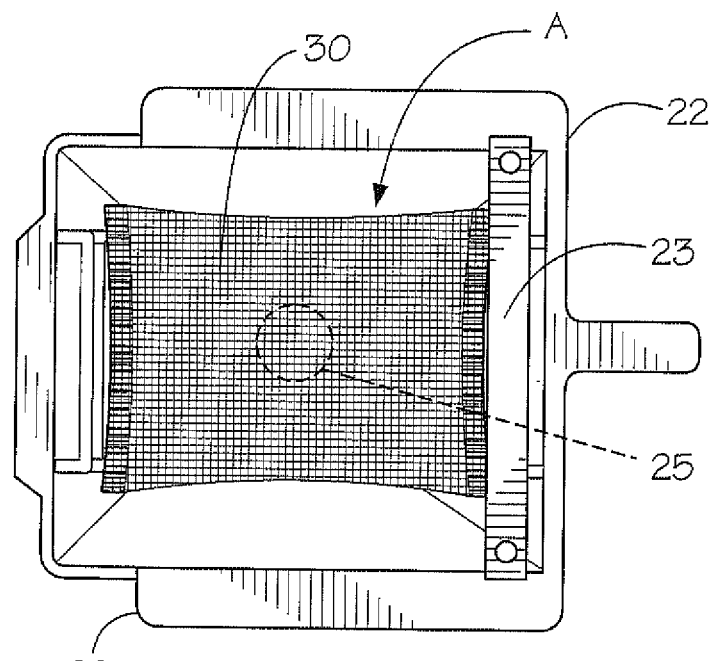
FIG. 3 is a top plan view of a tea brewing and sweetening product placed inside a brewing basked according to the present invention.

FIG. 2 shows mesh pouch 30 cut away to show the tea and sugar blend 31 of tea 32 and sugar 34 contained in the pouch. FIG. 3 shows the tea/sugar brewing pouch placed in brewing basket 22 of the tea brewing machine. As the hot water fills the filter basket, pouch 30 generally becomes submerged, and the steeping of the tea particles and sugar begins to extract the tea from the tea particles and dissolve the sugar producing a concentrated, sweetened tea solution dispensed through the basket outlet 25 into the urn through lid opening 18. Because the sugar is steeped in hot water, almost all the sugar is dissolved and much more than when sugar is added to the tea solution after brewing in the urn. The Brix of the solution is consistent since the same blend of tea particles and sugar granules is known.

Pouch 30 is preferably constructed from a mesh polymeric material such as nylon, polyester, polypropylene, polyethalene in a woven or nonwoven fabric. In some applications, it may also be possible to utilize a cotton nonwoven or woven fabric. Sugar refiners run sugar through a series of sieves rated with a US mesh number. The granules of a certain size get caught or retained in the sieve with smaller holes than the size of the granule. This is done in order to provide uniform size granules to the market. Typically, the sugar found in grocery stores and restaurants are of a small particle and are retained in a mesh sieve the size of 45-120. The smaller the mesh number the larger the granules of sugar, and the larger the mesh size the smaller the granules of sugar. The pouch mesh is preferably selected from a range of 50 to 300 microns. It has been found according to the present invention that an advantageous sieve size for the sugar of the present invention is that retained by US sieve numbers 3-35. Thus, the sugar granules are retained in the pouch brewing until they are dissolved with the tea.

Referring now to FIG. 4, an alternate embodiment of the invention is illustrated for a tea sweetening product A' wherein the tea particles 32, sugar granules 34, are contained in separate compartments 36 and 38 of pouch 30'. Each compartment is formed from a mesh material as disclosed for product A shown in FIGS. 1 through 3. The tea compartment is folded over the sugar compartment during brewing as shown in FIG. 5. The two compartment pouch includes a seal 40 around the pouch and a seal 41 dividing the pouch into compartments 36 and 38 and providing a fold line.

FIG. 6 illustrates another embodiment of the invention wherein pouch 30" has tea 32 contained in a pouch 42 having a seam 44 around its edges. A sugar pouch 46 having a seam 48 which contains sugar 34. Compartment 46 is sealed in any suitable way, including the four-sided seal of FIG. 6. Tea pouch 42 is placed on top of sugar pouch 46, in much the same manner as with the folded tea sweetening brewing product A' as shown in FIG. 5. In regard to embodiments A' and A", it is important that the tea compartment or pouch lays on top of the sugar compartment or pouch for consistent tea. First embodiment A is advantageous because larger granules of sugar are mixed in with the smaller particles of tea making the sugar dissolve easier and better. In addition, tea is extracted more fully in the blend because the granules reduce the compacting of the tea particles. The heat dissolves the sugar more completely in the sweetened concentrated tea solution in the basket. The larger granules allows the hot water to flow around the granules at the same time as the tea is being extracted out of the tea particles. Two steps have been reduced to one. In the prior method, the sugar goes in after the tea has cooled in a two-step process.

In accordance with the invention, a method for brewing sweetened tea is disclosed comprising the steps of providing a tea brewing machine having an urn, a brewing basket carried above the urn, a hot water dispenser for delivering hot water into the brewing basket, and a cold water dispenser for delivering cold water into the urn while brewing tea. Next, the method includes placing a mesh pouch containing a prescribed blend of tea particles and sugar into said brewing basket, and dispensing hot water into said brewing basket to steep the tea particles and sugar in said brewing basket producing a flow of concentrated sweetened tea solution out of said basket by into the urn. Finally, cold water is dispensed into the tea urn simultaneously with the flow of concentrated sweetened tea solution into the urn whereby the sugar is more completely and consistently dissolved in contrast to the sugar being dissolved in the tea solution in the urn.

Figure 8:
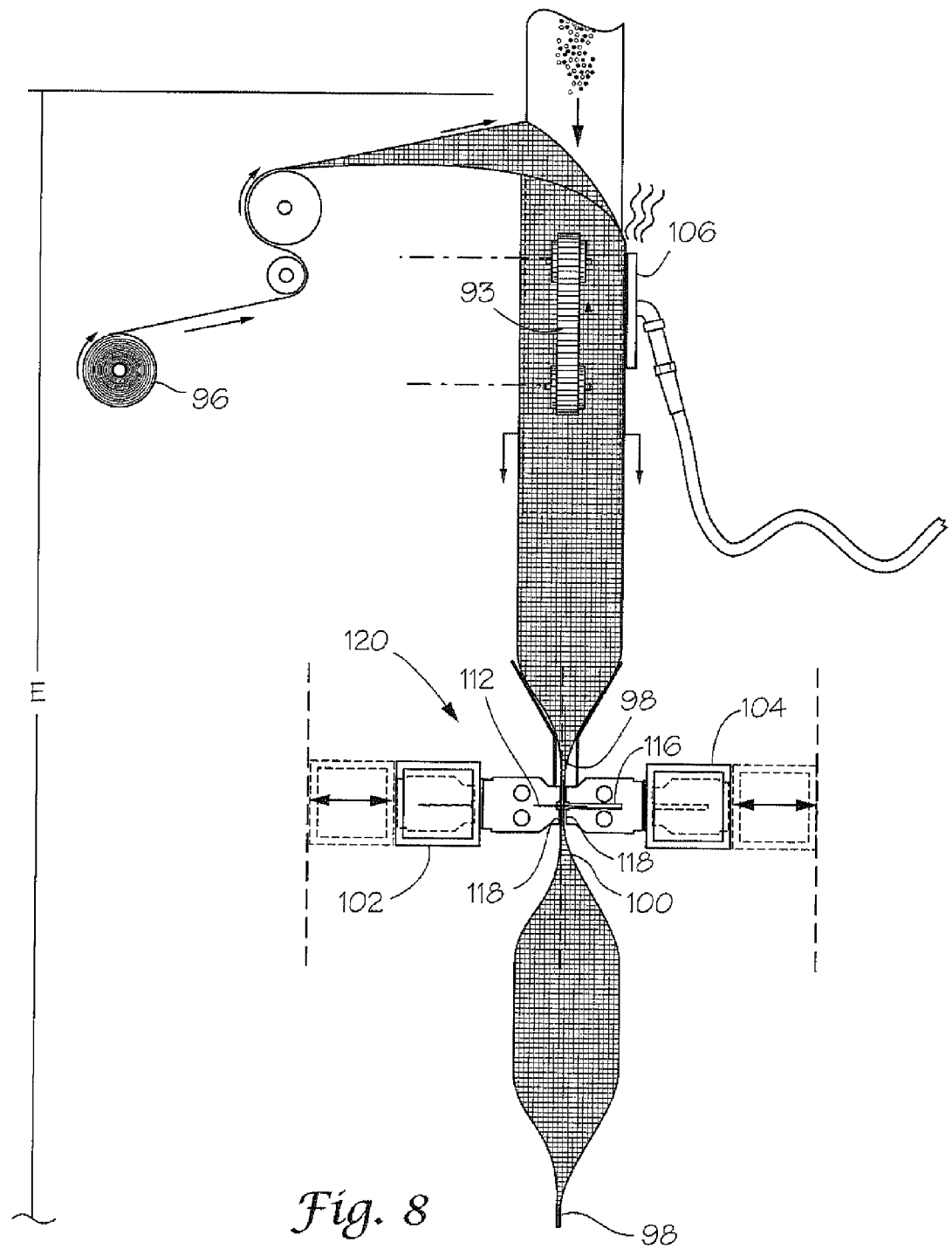
FIG. 8 is a side elevation illustrating a filling, sealing and cutting section for dispensing a tea particles and sugar granules blended into a mesh pouch, and sealing and cutting the top end after the pouch is filled.

Referring now to FIGS. 7A, 7B and 8, the system and method for producing the tea brewing and sweetening product A in pouch 30 will now be disclosed in more detail, along with the process for blending the tea and sugar, and packaging. As can best be seen in FIG. 7A, a blending apparatus, generally designated B, for blending tea 32 and sugar 34 is illustrated. Apparatus B includes a feeding section C having a separate tea bin 64, and a separate sugar bin 66 which separately deliver tea particles 32 and sugar granules 34 through conduits 68 and 70 through separate infeed ducts 72, 74, respectively. From the infeed ducts, tea particles 32 are delivered to a tea hopper 66 and sugar 34 is delivered to a sugar hopper 78 of blending section D. A feed auger 80 is located in tea hopper 76, and a feed auger 82 is located in sugar hopper 78. The augers meter or control the amounts of the tea particles and sugar granules being delivered by controlling the auger speeds, and hence the tea/sugar blend ratio. The preferred tea/sugar ratio is about ⅕ to ¹⁄₂₅, depending on the customer, with ¹⁄₁₆ being typical. The size of the tea particles varies with the customer's tea blend. Tea is widely available, for example, Henry P. Thompson Tea. Company in Peapack, N.J., is a source and the specifications are for black, oolong, and green (including white tea). Generally, for most tea blends, 98% of the tea particles will be retained by a U.S. mesh sieve size of 80. Sugar granules are widely available, for example Torus Trading Company of Monterrey, Mexico. The portions of tea particles 32 and sugar granules 34 are fed into a blending and dispensing funnel 84 where the tea particles and sugar granules are blended and dispensed through a nozzle 86. As can best be seen in FIG. 7B, the blending and dispensing funnel 84 may include any arrangement or device for spreading and blending the tea particles and sugar granules. In the illustrated embodiment, funnel 54 includes a plurality of layers of wire grates 86 and 88 angularly oriented at angles with each other to provide irregular grate openings 90 for the blend delivered through the funnel. Funnel 84 includes a bottom opening through which the tea and sugar blend 31 is delivered to a conduit or nozzle 92. Packaging section E includes a tubular roll of mesh material 94 being fed downwardly, which may be either tubular or flat mesh material delivering from a roll 96 to be seamed tubular. As the stock mesh material is drawn downwardly over nozzle 92, by roller conveyors 93, a side heating bar 106 seals the edges of the mesh material together. As in a typical vertical form, fill and seal machine, a pair of moveable heating and cutting units 102, 104 are provided. Each unit includes heated sealing bars 118 above and below the respective knife blade 112 and knife slot 116. Sealing and cutting unit 104 includes knife blade 112, and sealing and cutting unit 102 includes knife slot 116 which receives the knife blade when the heat bars of the units are pressed together for sealing and the seam is then cut. Knife 112 extends into knife slot 116 of unit 104 to cut midway through the seam forming a top seam 100 for the pouch below and a bottom seam 98 for the pouch above.

As can best be seen in FIG. 8, tubular mesh material is initially sealed across the lower bottom end at 98 by the previous seal and cut operation, leaving the mouth open whereupon tea and sugar blend 31 goes down through nozzle 98 into pouch 30. The pouch is dropped into a bin 99 and conveyed away. The next pouch 30 is sent to the sealing/cutting station 120 and its lower end sealed at 98 by the previous seal and cut operation and with its mouth open. The next pouch at sealing/cutting station 120 is then filled and sealed across the top whereupon the next bottom seal 98 is formed at the same time. Horizontal form, fill, and seal machines can equally be used to produce product A.

Thus, it can be seen that an advantageous product and process can be had according to the present invention for brewing tea and dissolving sugar granules together in a brewing basket. A concentrated sweetened tea solution flows out of the brewing basket into the urn to mix with water, for consistently brewing sweet tea. Preferably, at least one pouch in the form of a fine polymeric mesh pouch retains the tea and sugar during brewing. One reason the sugar works in the present invention is the granular size (retained by U.S. mesh sieve 3-35). It is like sugar in the raw, but bigger. The tea and the sugar blended in the mesh pouch brew and sweeten the tea at the same time. The hot water entering the brew basked brews the tea, dissolves the sugar, and sweetens the tea. The key is the heat. The heat in the brewing basket dissolves all the sugar. The larger sugar granules allow the water to flow around it at the same time you are extracting tea from the tea in the blend. The steps of brewing tea in an urn and then adding sugar to the tea is replaced by one step, brewing the tea and sweetening with sugar at the same time before they reach the urn.

While a preferred embodiment of the invention has been described using specific terms, such description is for illustrative purposes only, and it is to be understood that changes and variations may be made without departing from the spirit or scope of the following claims.

What is claimed is:

1. A sweet tea brewing product for brewing and sweetening tea in a brewing basket of a tea making machine comprising:

at least one water permeable mesh pouch for placement in said brewing basket during brewing;

tea particles and sugar granules contained in said at least one mesh pouch;

wherein the size of said sugar granules is in the range of U.S. mesh sieve nos. 3-35;

said mesh pouch having mesh openings being generally smaller than the size of said sugar granules and said tea particles for retention of said granules and particles; and said tea particles and sugar granules being brewed and dissolved in said brewing basket during steeping of said tea particles and sugar granules in hot water to produce a concentrated sweet tea solution delivered from said basket.

2. The product of claim 1 wherein said at least one mesh pouch is constructed from one of a polymeric mesh and cotton mesh material.

3. The product of claim 2 wherein said polymeric mesh material includes one of nylon, polyester, polypropylene, and polyethelene mesh material.

4. The product of claim 2 wherein said mesh material has a mesh selected from a range of about 50 to 300 microns.

5. The product of claim 4 wherein the tea particles are retained by a U.S. mesh sieve no. 80.

6. The product of claim 2 wherein said at least one mesh pouch contains tea particles and sugar granules in a prescribed blend ratio.

7. The product of claim 6 wherein said at least one mesh pouch includes a mesh pouch containing said tea particles and sugar granules blended together in said blend ratio.

8. The product of claim 7 wherein said polymer material has a mesh selected from a range of about 50 to 300 microns.

9. The product of claim 6 wherein said at least one mesh pouch includes a first compartment containing said tea particles and a second compartment containing said sugar granules.

10. The product of claim 9 wherein said first and second compartments are joined together at a fold line so that the first compartment folds over said second compartment in the brewing basket.

11. The product of claim 10 wherein said mesh pouch has a mesh of 50 to 300 microns.

12. The product of claim 6 wherein the blend ratio of tea to sugar is in the range of 1:5 to 1:25.

13. A tea brewing system for brewing sweetened tea comprising:
a tea brewing machine having a removable brewing basket and a brewing urn;
a source of tea particles for placement into said brewing basket during brewing; and
a source of sugar granules for placement into said brewing basked during brewing wherein the size of said sugar granules is in the range of U.S. mesh sieve nos. 3-35;
at least one water permeable mesh pouch containing said source of tea particles and said source of sugar granules in a desired blend ratio;
a cold water pipe for dispensing water into said tea urn during brewing;
a hot water dispenser for dispensing hot water into said brewing basket to steep said tea particles and sugar granules in hot water in the basket and extract tea and dissolve sugar to produce a concentrated sweetened tea solution;
whereby said concentrated sweetened tea solution enters the urn to mix with said water from said water pipe to provide accurate and consistent sweet tea.

14. The system of claim 13 wherein said at least one mesh pouch is constructed from one of a poloymeric mesh and cotton mesh material.

15. The system of claim 14 wherein said mesh pouch has a mesh selected from a range of about 50 to 300 microns.

16. The system of claim 14 wherein the tea particles are retained by a US mesh sieve no. 80.

17. The system of claim 14 wherein a least one water permeable pouch includes a single mesh pouch containing said tea particles and sugar granules blended together in a desired blend ratio.

18. The system of claim 17 wherein said tea particles are retained by a U.S. mesh sieve of about 80.

19. The system of claim 13 wherein said blend ratio is in the ratio of about 1:5 to 1:25.

20. The system of claim 15 wherein at least one mesh pouch includes a mesh pouch containing said tea particles and sugar granules blended together in the desired blend ratio.

21. The system of claim 15 wherein at least one mesh pouch includes a first mesh compartment containing said tea particles and a second mesh compartment containing said sugar granules wherein said first compartment is placed on top of said second compartment during brewing.

22. The system of claim 21 including a fold seam between said first and second compartments, said first compartment being folded above said fold seam to overlie said second compartment when brewing in said brewing basket.

23. A method for brewing sweetened teas comprising:
providing a tea brewing machine having an urn, a brewing basket carried above the urn, a hot water dispenser for delivering hot water into said brewing basket, and a cold water dispenser for delivering cold water into said urn while brewing tea;
placing a mesh pouch containing a prescribed blend of tea particles and sugar into said brewing basket;
wherein the size of the granules of said sugar is in the range of U.S. mesh sieve nos. 3-35;
producing a flow of concentrated sweetened tea solution out of said basket by dispensing hot water into said brewing basket containing said mesh pouch and steeping the tea particles and sugar in said brewing basket; and
dispensing cold water into said tea urn simultaneously with the flow of concentrated sweetened tea solution into the urn;
whereby the sugar is more completely and consistently dissolved in contrast to the sugar being dissolved in the tea solution in the urn.

24. The method of claim 23 including providing a mesh pouch having a mesh generally between about 50 to 300 microns.

* * * * *